(12) United States Patent
Hayahi

(10) Patent No.: US 10,354,109 B2
(45) Date of Patent: Jul. 16, 2019

(54) STATIONARY SCANNER DEVICE, STATIONARY SCANNER SYSTEM, AND HANDHELD SCANNER HOLDING STRUCTURE

(71) Applicant: NEC Platforms, Ltd., Kawasaki-shi, Kanagawa (JP)

(72) Inventor: Manabu Hayahi, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/307,450

(22) PCT Filed: Apr. 28, 2015

(86) PCT No.: PCT/JP2015/063400
§ 371 (c)(1),
(2) Date: Oct. 28, 2016

(87) PCT Pub. No.: WO2016/051842
PCT Pub. Date: Apr. 7, 2016

(65) Prior Publication Data
US 2017/0061170 A1 Mar. 2, 2017

(30) Foreign Application Priority Data
Sep. 30, 2014 (JP) .................. 2014-199904

(51) Int. Cl.
*G06K 7/10* (2006.01)
*G06K 7/14* (2006.01)
*G07G 1/00* (2006.01)
*G06K 19/06* (2006.01)

(52) U.S. Cl.
CPC .......... *G06K 7/109* (2013.01); *G06K 7/1417* (2013.01); *G06K 19/06037* (2013.01); *G07G 1/0018* (2013.01); *G07G 1/0045* (2013.01)

(58) Field of Classification Search
CPC .......... G06K 7/10792; G06K 7/10801; G06K 7/10811; G06K 7/10851; G06K 7/10861;
(Continued)

(56) References Cited

U.S. PATENT DOCUMENTS

| | | | | |
|---|---|---|---|---|
| 6,098,939 A | * | 8/2000 | He | ............................ H02G 1/00 174/58 |
| 2009/0321526 A1 | * | 12/2009 | Yokoyama | ............. H02G 11/02 235/472.01 |

(Continued)

FOREIGN PATENT DOCUMENTS

| | | |
|---|---|---|
| CN | 101615773 A | 12/2009 |
| JP | 04-028356 U | 3/1992 |

(Continued)

OTHER PUBLICATIONS

International Search Report for PCT/JP2015/063400 dated Jul. 28, 2015 [PCT/ISA/210].

(Continued)

*Primary Examiner* — Thien M Le
*Assistant Examiner* — Tae W Kim
(74) *Attorney, Agent, or Firm* — Sughrue Mion, PLLC

(57) ABSTRACT

A stationary scanning device includes: a fixed scanner portion that is mounted on a front surface of a support column and is configured to optically read item data; a handheld scanner configured to optically read the item data; and a holding portion that is mounted on a side surface of the support column and is configured to hold the handheld scanner, the holding portion being configured to hold the handheld scanner such that a cable extending from an end portion of the handheld scanner falls in a space with a predetermined distance from the front surface and the side surface of the support column.

5 Claims, 13 Drawing Sheets

(58) Field of Classification Search
CPC .. G06K 7/10871; G06K 7/10891; G06K 7/14; G06K 7/10881; G06K 7/109; G06K 2207/1012; G06K 7/0008; G06K 7/0095; G06K 7/089; G06K 7/10; G06K 7/10564; G06K 7/10584; G06K 7/10594; G06K 7/10603; G06K 7/10663; G06K 7/10673; G06K 7/10693; G07G 1/0054; G07G 1/0081; H02J 7/0044; G06Q 20/202; G06Q 30/0601; H04N 2101/00
USPC .................................................. 235/462.45
See application file for complete search history.

(56) References Cited

U.S. PATENT DOCUMENTS

2012/0097745 A1\* 4/2012 Brock ................ G06K 7/10881
235/472.02
2014/0252094 A1\* 9/2014 Wright ................ G06K 7/1096
235/440

FOREIGN PATENT DOCUMENTS

| JP | 10-320498 A | 12/1998 |
| JP | 2001065015 A \* | 5/2001 |
| JP | 2010-009202 A | 1/2010 |
| JP | 2010-257120 A | 11/2010 |

OTHER PUBLICATIONS

Written Opinion for PCT/JP2015/063400 dated Jul. 28, 2015 [PCT/ISA/237].

Communication dated Jun. 26, 2017, from the State Intellectual Property Office of People's Republic of China in counterpart Application No. 201580023554.6.

\* cited by examiner

TOP VIEW
(c)

SIDE VIEW
(b)

FRONT VIEW
(a)

SECTIONAL VIEW
(d)

STATIONARY SCANNER DEVICE, STATIONARY SCANNER SYSTEM, AND HANDHELD SCANNER HOLDING STRUCTURE

CROSS REFERENCE TO RELATED APPLICATIONS

This application is a National Stage of International Application No. PCT/JP2015/063400 filed Apr. 28, 2015, claiming priority based on Japanese Patent Application No. 2014-199904 filed Sep. 30, 2014, the contents of all of which are incorporated herein by reference in their entirety.

TECHNICAL FIELD

This invention relates to a stationary scanning device, a stationary scanning system, and a handheld scanner holding structure.

BACKGROUND ART

Stationary scanning devices (also referred to as vertical scanning devices), which are optical reading devices, are used for registering items to be purchased by customers. The items are registered in the stationary scanning device by being passed over a fixed scanner portion mounted on the front surface of a support column (the surface of the stationary scanning device facing the front side) such that barcodes of the items are scanned. The stationary scanning device includes, in addition to the scanner portion mounted on the front surface of the support column, a handheld scanner configured to scan barcodes of items to be purchased by customers, thereby registering the items.

A related-art stationary scanning device is illustrated in FIG. 9. Part (a) of FIG. 9 is a front view of a stationary scanning device installed on a checkout counter (also referred to as a bagging counter). Part (b) of FIG. 9 is a side view of the stationary scanning device, in which the stationary scanning device is illustrated with a cart having a shopping basket placed thereon.

The stationary scanning device includes a key board 22 and a display portion 23 provided through intermediation of a support column 21. A fixed scanner portion 11 is mounted on the support column 21 at a position slightly lower than the display portion 23.

The handheld scanner 10 is held on a holding portion 12 mounted on the upper side-surface of the support column 21 when not in use. A cable 13 extends from the inside of the stationary scanning device to the handheld scanner 10. The cable 13 is drawn out of the stationary scanning device to pass under the checkout counter 20 (not shown), and then extends to the handheld scanner 10 from the front side of a checkout counter 20.

When being held on the holding portion 12, a gripping part of the handheld scanner 10 faces downward in a substantially vertical direction, and hence the cable 13 hangs down in the vertical direction below the counter surface of the checkout counter 20. Thus, when scanning is performed with the scanner portion mounted on the front surface of the support column without using the handheld scanner 10, a shopping basket or an item may hit the cable 13 to hinder scanning operation. Consequently, in order to prevent such trouble, attention needs to be paid to the cable 13, such as avoiding the cable 13 or drawing the cable 13.

Further, there may occur a trouble that, when passing a customer passage extending in parallel to the checkout counter 20, a cart having a shopping basket placed thereon may be got caught on the cable 13 of the handheld scanner 10, which hangs down from the checkout counter 20. Consequently, in order to prevent such trouble, attention needs to be paid to the cable 13, such as preventing the cable 13 from hanging down over the checkout counter 20.

In Patent Document 1, there is disclosed a fixing device for a handheld scanner, which is mounted on a vertical scanning device and is capable of turning on and off the handheld scanner.

PRIOR ART DOCUMENTS

Patent Document

Patent Document 1: JP-A-2010-257120

DISCLOSURE OF THE INVENTION

Problem to be Solved by the Invention

However, in Patent Document 1, a method of fixing a handheld scanner is only disclosed, and no consideration is made on problems due to a cable of the handheld scanner and means for solving the problems.

It is an object of this invention to provide a stationary scanning device capable of eliminating a need to pay particular attention to a cable of a handheld scanner when the handheld scanner is not in use.

Means to Solve the Problem

A stationary scanning device according to this invention comprises a fixed scanner portion that is mounted on a front surface of a support column and is configured to optically read item data; a handheld scanner configured to optically read the item data; and a holding portion that is mounted on a side surface of the support column and is configured to hold the handheld scanner the holding portion being configured to hold the handheld scanner such that a cable extending from an end portion of the handheld scanner falls in a space with a predetermined distance from the front surface and the side surface of the support column.

A stationary scanning system according to this invention comprises a checkout counter; a support column mounted upright on the checkout counter; a support column guard mounted on the checkout counter, for protecting a front surface and a side surface of the support column; a fixed scanner portion that is mounted on the front surface of the support column and is configured to optically read item data; a handheld scanner configured to optically read the item data; and a holding portion that is mounted on the side surface of the support column and is configured to hold the handheld scanner, the holding portion being configured to hold the handheld scanner such that a cable extending from an end portion of the handheld scanner falls in a space formed between the support column guard and the support column.

A handheld scanner holding structure according to this invention is applicable to a stationary scanning device comprising a fixed scanner portion that is mounted on a front surface of a support column and is configured to optically read item data; and a handheld scanner configured to optically read the item data. The handheld scanner holding structure comprises a holding portion that is mounted on a side surface of the support column and is configured to hold the handheld scanner, the holding portion being configured to hold the handheld scanner such that a cable extending from an end portion of the handheld scanner falls in a space with a predetermined distance from the front surface and the side surface of the support column.

Effect of the Invention

According to this invention, it is possible to provide the stationary scanning device capable of eliminating the need to pay particular attention to the cable of the accompanying handheld scanner when the handheld scanner is not in use.

MODES FOR EMBODYING THE INVENTION

In the following, embodiments of this invention are described in detail with reference to the drawings. Description of similar contents is appropriately omitted to avoid repetitive and cumbersome description.

1. First Embodiment

A first embodiment of this invention is described with reference to FIG. 1 to FIG. 7.

Figure 1A:
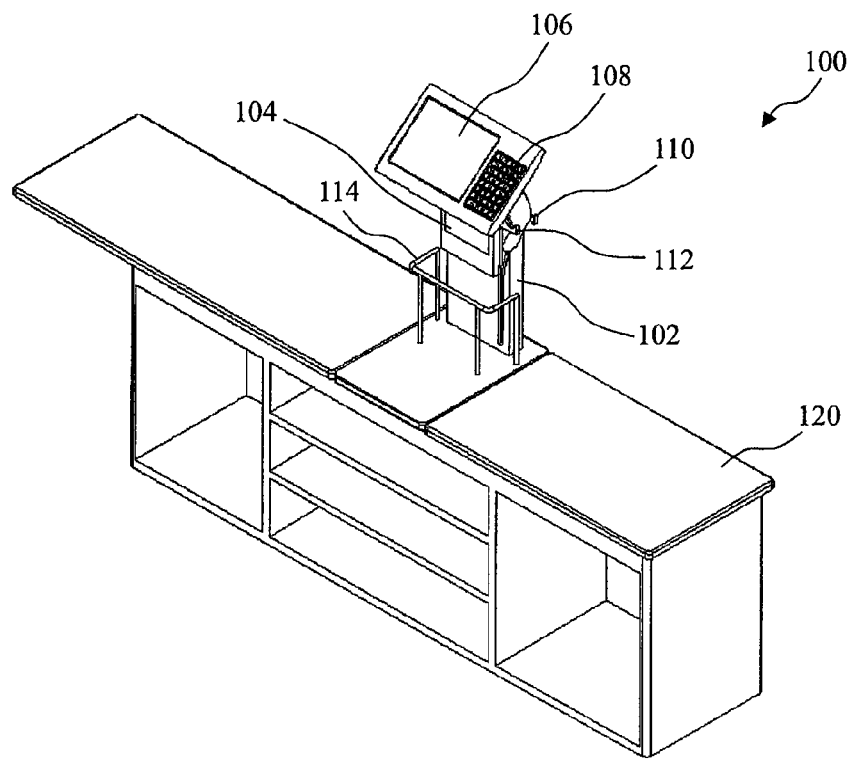
FIG. 1A is a perspective view for illustrating a stationary scanning device installed on a checkout counter.
Figure 1B:
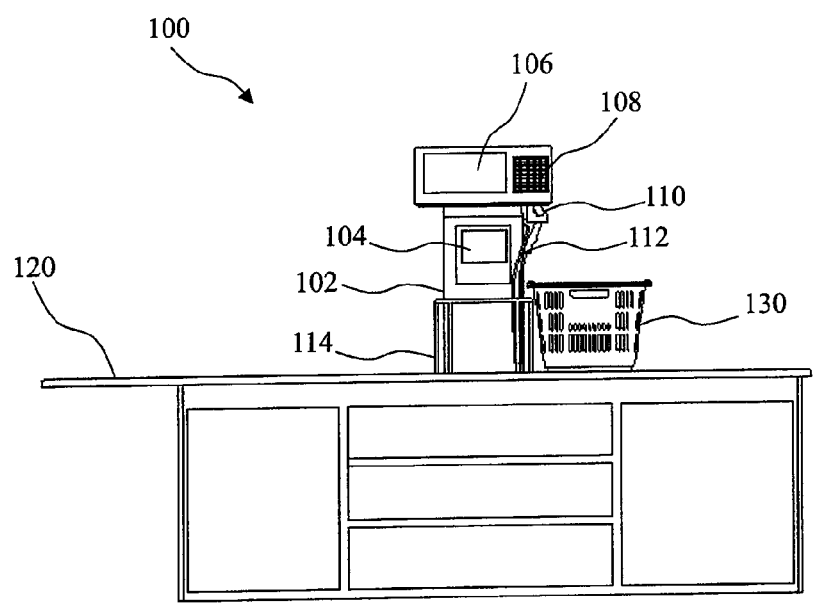
FIG. 1B is a front view for illustrating the stationary scanning device installed on the checkout counter.
Figure 1C:
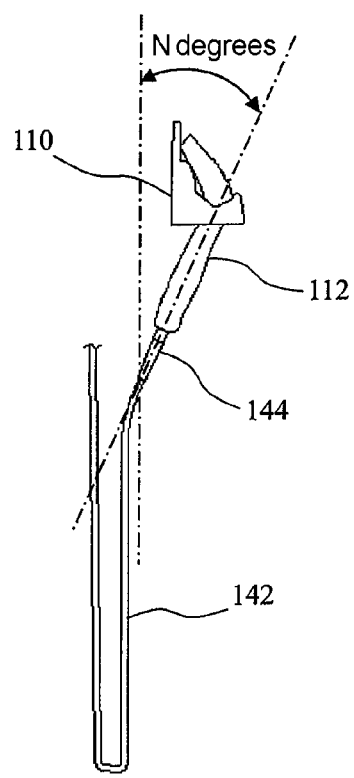
FIG. 1C is an enlarged view for illustrating a holding portion, a handheld scanner, and a cable illustrated in FIG. 1B.

FIG. 1A is a perspective view of a stationary scanning device installed on a checkout counter. FIG. 1B is a front view of the stationary scanning device installed on the checkout counter, in which a shopping basket is added. FIG. 1C is an enlarged view of only a holding portion for a handheld scanner, the held handheld scanner, and a cable of the handheld scanner (partly omitted).

As illustrated in FIG. 1B, a stationary scanning device 100 includes a fixed scanner portion (fixed scanner portion) 104 that is mounted on the front surface of a support column (support portion) 102 mounted on a checkout counter 120 (the surface of the stationary scanning device facing the front side). The fixed scanner portion 104 is configured to scan barcodes of items. The stationary scanning device 100 further includes a display portion 106 for a cashier and a key board 108 provided on an upper part of the support column 102, a holding portion (holding structure) 110 for a handheld scanner, and a handheld scanner 112. The surfaces of the support column (support portion) 102 on the left side and the right side with respect to the front surface are referred to as side surfaces of the support column, and the surface of the support column on the rear side thereof is referred to as a rear surface of the support column. As described with reference to FIG. 5, the handheld scanner 112 includes a reading part 116 configured to optically read barcodes, a gripping part 118 for gripping the handheld scanner 112, and a cable 142 that is connected to the reading part 116 and passes through the gripping part 118 to be drawn out of the end portion of the gripping part 118. A support column guard 114 is provided near the root of the support column 102, for preventing a shopping basket 130 and other objects from hitting the support column 102, thereby protecting the support column 102.

As illustrated in FIG. 1C, the handheld scanner 112 is held on the holding portion 110 such that the gripping part 118 faces downward and forms a predetermined angle of N degrees (for example, about 25 degrees in this embodiment) to the vertical direction. The cable 142 extends from the end portion of the handheld scanner 112 through a cable gland 144 for preventing the cable from being bent or disconnected. Although it is not clear from FIG. 1C, a coiled cable is used as the cable 142, for example.

The cable 142 extending from the handheld scanner 112 keeps an angle of the gripping part 118 of the handheld scanner 112 until passing through the cable gland 144, which has rigidity preventing the cable gland 144 from being deformed easily, and hangs down after passing through the cable gland 144. Further, as described later, the cable 142 is fixed at a drawing-out port formed in the support column 102, and thus has a length with which the lower end of the hanging-down cable 142 is not brought into contact with the checkout counter 120 when the handheld scanner 112 is held on the holding portion 110. The cable 142 may have a length with which the lower end of the hanging-down cable 142 is brought into contact with the checkout counter 120, but does not hang down over the checkout counter 120.

As illustrated in FIG. 1B and FIG. 1C, the cable 142 of the handheld scanner 112 falls in a space with a predetermined distance from the support column 102 of the stationary scanning device 100 (the inner side of the support column guard 114 in this embodiment), and does not hang down over the checkout counter 120.

Figure 2:
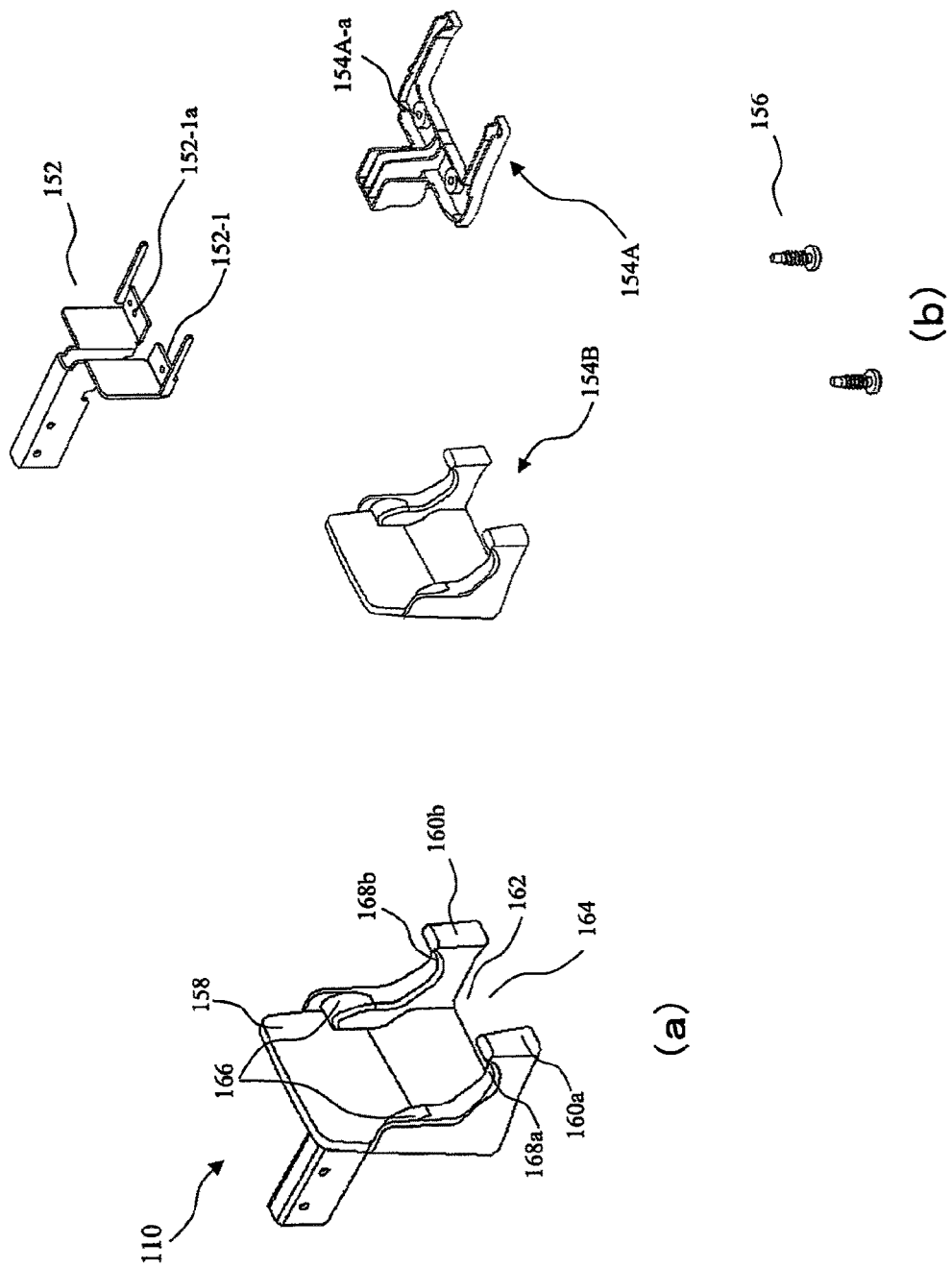
FIG. 2 is a view for illustrating the structure of a holding portion according to a first embodiment of this invention, in which part (a) is a perspective view, and part (b) is an exploded view.

FIG. 2 is an illustration of the structure of the holding portion 110. The holding portion 110 has the structure in which a metal base 152 having a projecting plate 152-1 is vertically sandwiched between two mold components 154A and 154B made of resin. In addition, in the holding portion 110, screws 156 are screwed into screw holes of the mold component 154B from the lower surface of the mold component 154A through holes 154A-a and holes 152-1a of the projecting plate 152-1 such that the components are fixed.

Figure 3:
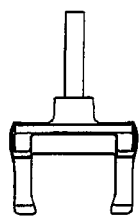
FIG. 3 is a view for illustrating the holding portion according to the first embodiment of this invention, in which part (a) is a front view, part (b) is a side view, part (c) is a top view, and part (d) is a sectional view.
Figure 3:
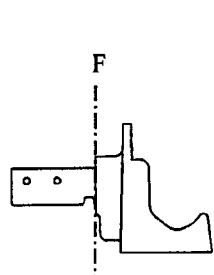
Figure 3:
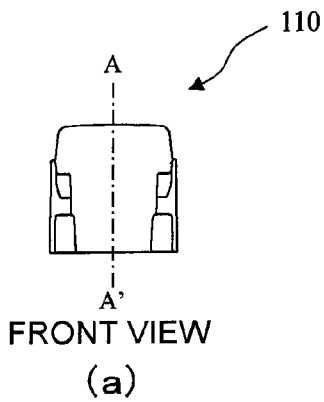
Figure 3:
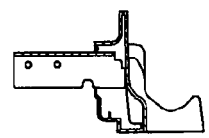

Further, in the holding portion 110, two arms of a first arm 160a and a second arm 160b extend from a base plate 158 of the mold component 154B. A space between the two arms of the first arm 160a and the second arm 160b is a receiving space 162 for receiving the handheld scanner 112. A space between the leading ends of the first arm 160a and the second arm 160b is an insertion opening 164 for inserting the handheld scanner 112 when the handheld scanner 112 is held. FIG. 3 is a view for illustrating the holding portion 110, in which part (a) is a front view, part (b) is a side view, part (c) is a top view, and part (d) is a sectional view taken along the line A-A' of the front view. The part of the holding portion 110 illustrated on the left side of the line F-F' of the side view of part (b) of FIG. 3 is inserted into the support column 102 and fixed therein.

FIG. 4A to FIG. 4F are enlarged views of the handheld scanner 112 in a state of being held on the holding portion 110.

Figure 4A:
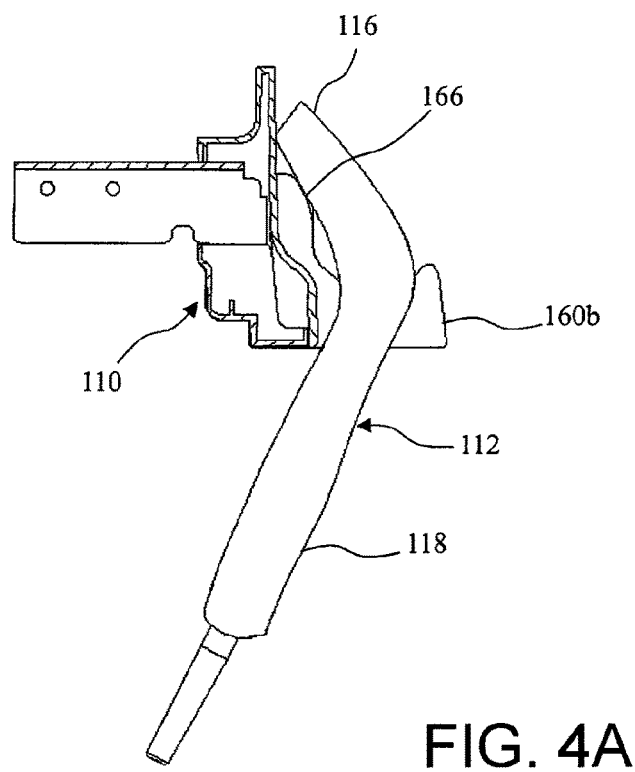
FIG. 4A is a sectional view for illustrating the central part of a handheld scanner holding portion when the handheld scanner is held on the holding portion according to the first embodiment of this invention.
Figure 4B:
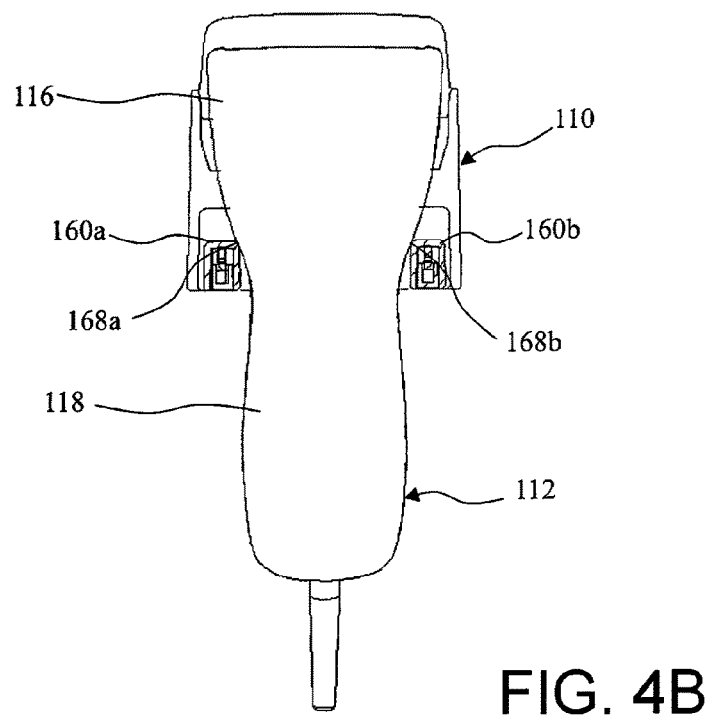
FIG. 4B is a front view for illustrating the handheld scanner in a state of being held on the holding portion illustrated in FIG. 4A, in which arms of the holding portion are illustrated in section.

FIG. 4A is an illustration of the longitudinal section of the central part of the holding portion 110. As illustrated in FIG. 4A, at two points near the side surfaces of the reading part 116, the lower surface of the reading part 116 of the handheld scanner 112 is in abutment against abutment surfaces (see FIG. 2) 166 formed on the left and right sides of the base plate 158 of the holding portion 110. As illustrated in FIG. 4B, the handheld scanner 112 has the rounded side surfaces with a constricted part formed between the reading part 116 and the gripping part 118, and the side surfaces near the constricted part are in abutment against side-surface abutment surfaces 168a and 168b formed on the two arms 160a and 160b of the holding portion 110, respectively. In FIG. 4B, the abutment parts of the two arms 160a and 160b are illustrated in section.

The abutment surfaces (lower-surface abutment surfaces) (see FIG. 2) 166 of the holding portion 110, against which the lower surface of the reading part 116 of the handheld scanner 112 is in abutment, are separately formed on the two roots of the first arm 160a and the second arm 160b. However, the abutment surface 166 may be continuous without separation. Further, instead of the roots of the first arm 160a and the second arm 160b, the abutment surface 166 may be formed at one point on the center of the base plate 158.

Figure 4C:
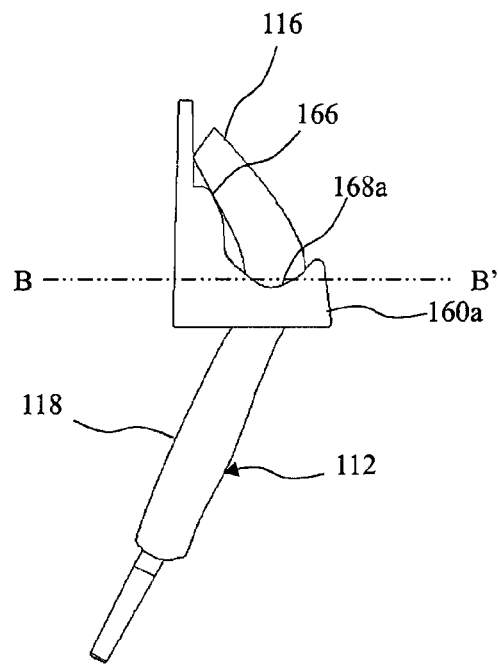
FIG. 4C is a side view for illustrating the handheld scanner in a state of being held on the holding portion illustrated in FIG. 4A.
Figure 4D:
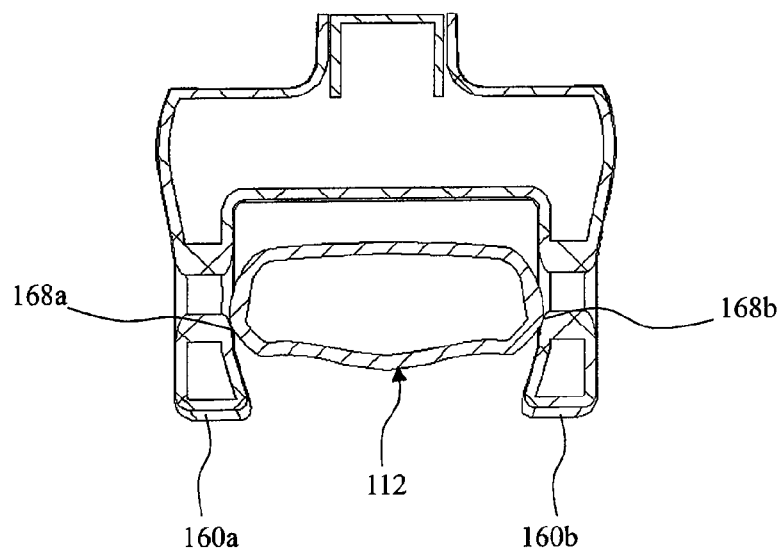
FIG. 4D is a sectional view taken along the line B-B' of FIG. 4C.

FIG. 4D is a sectional view of the line B-B' of FIG. 4C.

The handheld scanner 112 is held under a state illustrated in FIG. 4A with the lower surface of the reading part 116 being in abutment against the abutment surfaces 166 of the holding portion 110, and the side surfaces being partly in abutment against, near the constricted part, the side-surface abutment surfaces 168a and 168b of the respective two arms of the holding portion 110.

Figure 4E:
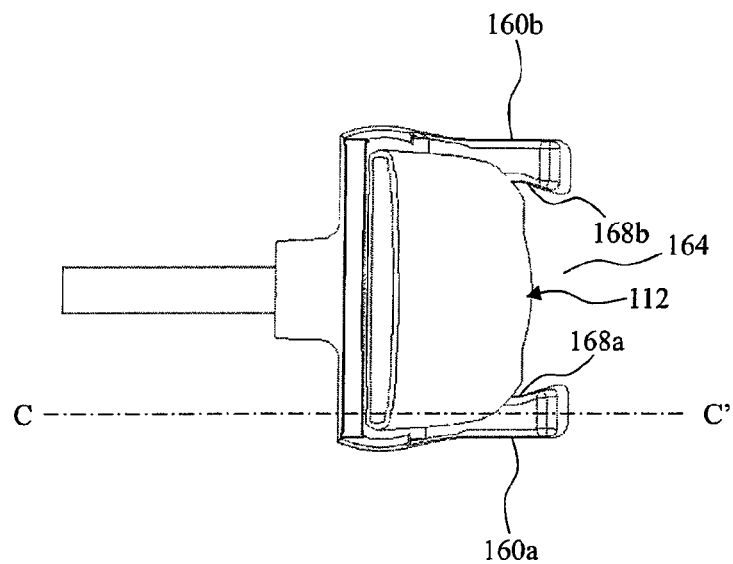
FIG. 4E is a top view for illustrating the handheld scanner in a state of being held on the holding portion illustrated in FIG. 4A.

As illustrated in FIG. 4E, when the holding portion 110 is seen from the above, the first and second arms 160a and 160b have shapes that a space formed between the two arms is gradually narrowed toward the leading ends of the arms, namely, the insertion opening 164. Further, the side-surface abutment surfaces 168a and 168b formed on the first and second arms 160a and 160b also have shapes that the side-surface abutment surfaces extend inwardly and a gap therebetween is gradually narrowed toward the insertion opening 164.

Figure 4F:
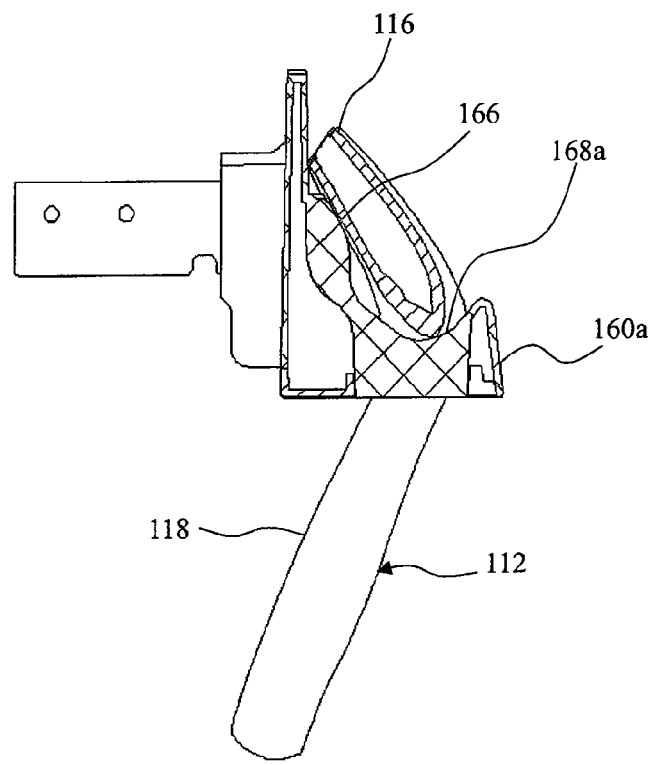
FIG. 4F is a sectional view taken along the line C-C' of FIG. 4E.

FIG. 4F is a sectional view of the line C-C' of FIG. 4E.

As illustrated in FIG. 4F, when seen from the side surface direction, each of the side-surface abutment surface 168a and the side-surface abutment surface 168b (not shown) of the two arms of the holding portion 110, against which the side surfaces of the handheld scanner 112 near the constricted part are in abutment, has a shape drawing an upward slope from around the leading end side of a position at which the side surface of the handheld scanner 112 is in abutment.

FIG. 4D is a top sectional view of the side-surface abutment surfaces 168a and 168b of the two arms of the holding portion 110, against which the side surfaces of the handheld scanner 112 are in abutment.

Each of the side-surface abutment surfaces 168a and 168b of the two arms of the holding portion 110, against which the side surfaces of the handheld scanner 112 are in abutment, has a shape that the side-surface abutment surface extends inwardly toward the other side-surface abutment surface while drawing a slope. The side surfaces of the handheld scanner 112 are in abutment against the above-mentioned side-surface abutment surfaces 168a and 168b of the first arm 160a and the second arm 160b of the holding portion 110, and hence the handheld scanner can be prevented from moving (shifting) in the direction of the insertion opening 164 when being held. Consequently, the handheld scanner 112 can be prevented from falling from the holding portion 110.

The abutment surfaces 166 of the holding portion 110, against which the lower surface of the reading part 116 of the handheld scanner 112 is brought into abutment, are needed for the gripping part 118 to be tilted (to face downward and form a predetermined angle to the vertical direction) when the handheld scanner 112 is in a held state. That is, in the held state of FIG. 4A, counterclockwise turning force acts on the handheld scanner 112 due to the weight of the handheld scanner 112 itself and the weight of the cable 142. The counterclockwise turning force causes, with the side-surface abutment surfaces 168a and 168b being fulcrums, the lower end portion of the gripping part 118 to be directed in the vertical direction. Further, the counterclockwise turning force acts on the reading part 116 as well. The abutment surfaces 166 prevent turning of the handheld scanner 112 due to the above-mentioned turning force, and keep the gripping part 118 in the tilted posture illustrated in FIG. 4A. Meanwhile, the side-surface abutment surfaces 168a and 168b of the first arm 160a and the second arm 160b of the holding portion 110 are needed for maintaining the gripping part 118 of the handheld scanner 112 in the tilted posture.

Figure 5:
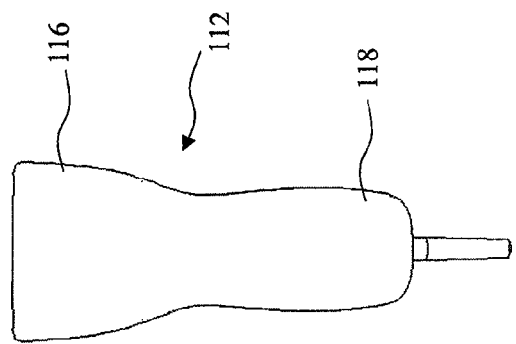
FIG. 5 is a view for illustrating the handheld scanner, in which part (a) is a perspective view for illustrating the handheld scanner, and part (b) is a view of the handheld scanner when seen from the rear side.
Figure 5:
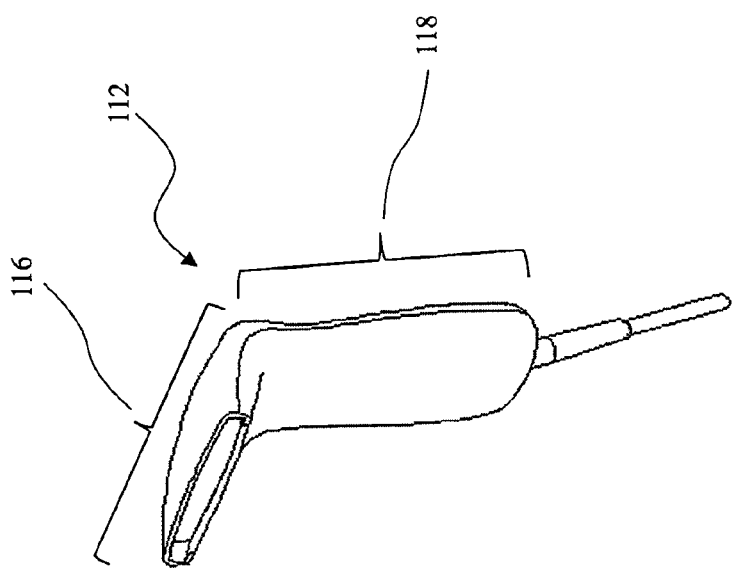

Part (a) of FIG. 5 is a perspective view of the handheld scanner 112. The handheld scanner 112 includes the reading part 116 configured to read barcodes, and the gripping part 118 for gripping the handheld scanner 112. The reading part 116 and the gripping part 118 are continuously formed to form a predetermined angle (for example, about 120 degrees in this embodiment) when seen from the side surfaces of the reading part 116 and the gripping part 118.

As illustrated in part (b) of FIG. 5, the reading part 116 has an end-narrow shape that the width (a distance between the side surfaces) of the reading part 116 is gradually reduced toward the gripping part 118. The handheld scanner 112 is narrowest near the boundary between the reading part 116 and the gripping part 118, and becomes slightly wider at the gripping part 118. In short, the handheld scanner 112 has a constricted part near the boundary between the reading part 116 and the gripping part 118. However, the gripping part 118 may have a width equal to or smaller than the smallest width near the boundary between the reading part 116 and the gripping part 118.

As illustrated in the sectional view of FIG. 4D, the side surfaces of the handheld scanner 112 have a rounded shape. It is desired that the side surfaces of the handheld scanner 112 have the rounded shape, but the side surfaces may have a polygonal shape including a quadrangular shape in section, for example.

The handheld scanner 112 is held on the holding portion 110 as follows: for example, a user grips the gripping part 118 of the handheld scanner, inserts the narrowest part between the reading part 116 and the gripping part 118 through the insertion opening 164 formed between the first arm 160a and the second arm 160b, and then releases his/her hand gripping the handheld scanner 112. Then, the handheld scanner 112 falls within the receiving space 162 of the holding portion 110 due to the weight of the handheld scanner 112 itself and the weight of the cable 142, shifts in the direction of the insertion opening 164, and finally enters the state illustrated in FIG. 4A.

The handheld scanner 112 is removed from the holding portion 110 as follows: the user may grip the gripping part 118 of the handheld scanner 112, and separate the handheld scanner 112 from the holding portion 110 such that the narrowest part between the reading part 116 and the gripping part 118 passes through the insertion opening 164 formed between the first arm 160a and the second arm 160b. The upper portion of the holding portion 110 is opened, and hence no structure holds the handheld scanner 112 from the above. Thus, the user can easily remove the handheld scanner 112 from the holding portion 110 by gripping the gripping part 118 of the handheld scanner 112, and lifting up the handheld scanner 112 a little.

Figure 6:
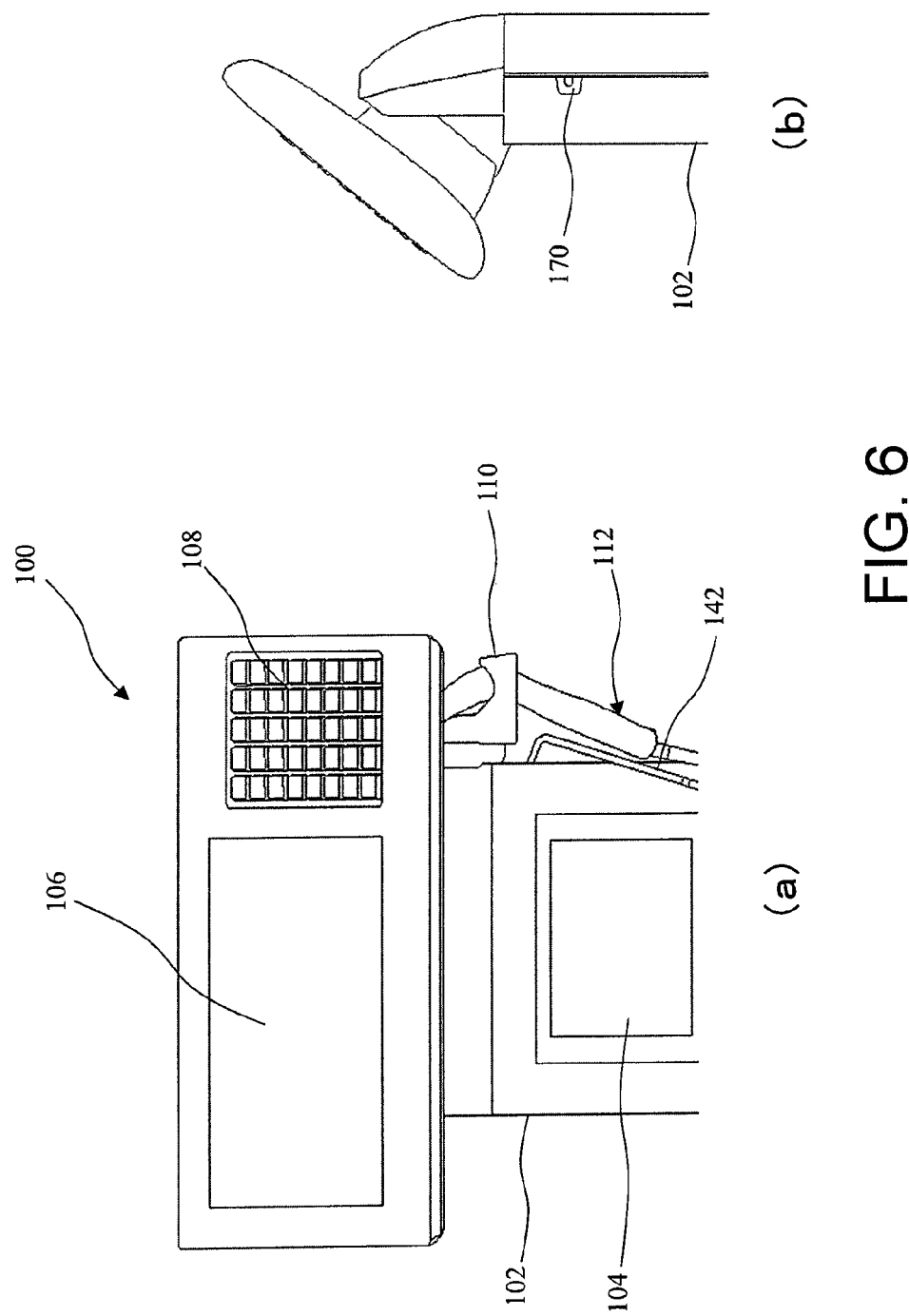
FIG. 6 is a view for illustrating the handheld scanner in a held state, in which part (a) is a front view for illustrating a state in which the handheld scanner is held on the holding portion, and part (b) is a side view of part (a).

FIG. 6 is an illustration of part of the stationary scanning device 100 of which the cable 142 of the handheld scanner 112 is drawn out, namely, a drawing-out port 170 for a cable. Part (a) of FIG. 6 is a front view of the stationary scanning device 100. Part (b) of FIG. 6 is a side view of part (a) of FIG. 6, in which the illustrations of the holding portion 110 and the handheld scanner 112 are omitted. As illustrated in FIG. 6, the cable 142 of the handheld scanner 112 is drawn out through the drawing-out port 170 formed in the side surface of the support column 102 of the stationary scanning device 100, and is fixed at the drawing-out port 170. This means that the length of the cable 142 from the drawing-out port 170 to the handheld scanner 112 is a fixed length. With this structure, when the handheld scanner 112 is held on the holding portion 110, as illustrated in FIG. 1A, the cable 142 is bent at the middle thereof into a U shape such that the bent portion is not in contact with the checkout counter 120.

Figure 7:
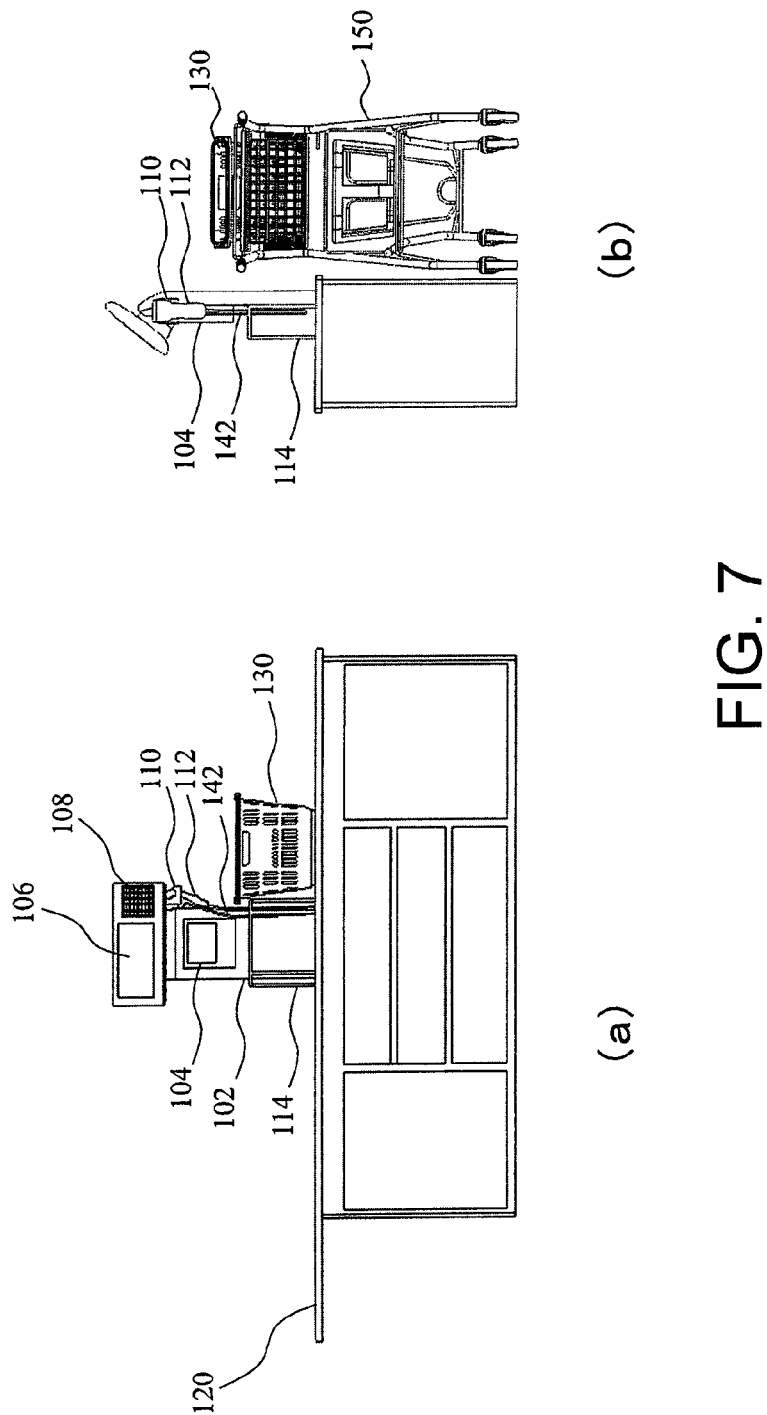
FIG. 7 is a view for illustrating a stationary scanning device installed on a checkout counter, in which part (a) is a front view for illustrating the stationary scanning device installed on the checkout counter, and part (b) is a side view for illustrating the stationary scanning device installed on the checkout counter.

Part (a) of FIG. 7 is a front view of the stationary scanning device 100 installed on the checkout counter 120. Part (b) of FIG. 7 is a side view of part (a) of FIG. 7, in which a cart 150 having the shopping basket 130 placed thereon is also illustrated. As is clear from FIG. 7, when the handheld scanner 112 is held on the holding portion 110, the gripping part 118 is tilted so as to face downward and form a predetermined angle to the vertical direction (for example, about 25 degrees in this embodiment). Consequently, the cable 142 falls in a space with a predetermined distance from the support column 102 of the stationary scanning device 100 (the inner side of the support column guard 114 in this embodiment), and does not hang down over the checkout counter 120 on the passage side for the cart 150. As a result, the cable 142 does not hinder the operation of scanning barcodes, and such a trouble is prevented that the cart 150 having the shopping basket 130 placed thereon is got caught on the cable 142 when passing by the checkout counter 120. Thus, according to the first embodiment of this invention, there is no need to pay particular attention to the cable 142 of the accompanying handheld scanner 112 when the handheld scanner 112 is not in use.

2. Second Embodiment

Next, a second embodiment of this invention is described with reference to FIG. 8A to FIG. 8D. The second embodiment is different from the first embodiment in a holding portion 110', specifically, the shape of two arms of the holding portion 110'. The remaining configuration is the same as that of the first embodiment. Parts of the holding portion 110' that have the same shapes as those of the holding portion 110 of the first embodiment are denoted by the same reference symbols as in the first embodiment.

Figure 8A:
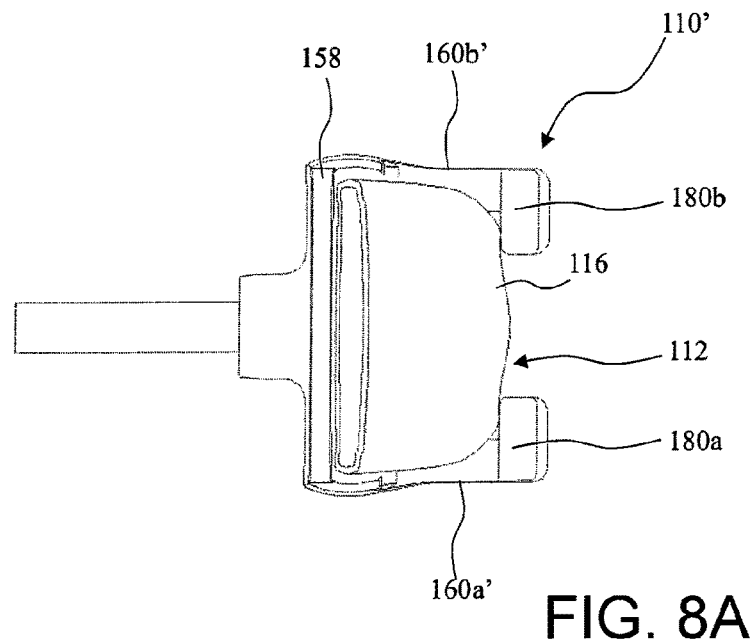
FIG. 8A is a top view for illustrating a state in which a handheld scanner is held on a holding portion according to a second embodiment of this invention.
Figure 8B:
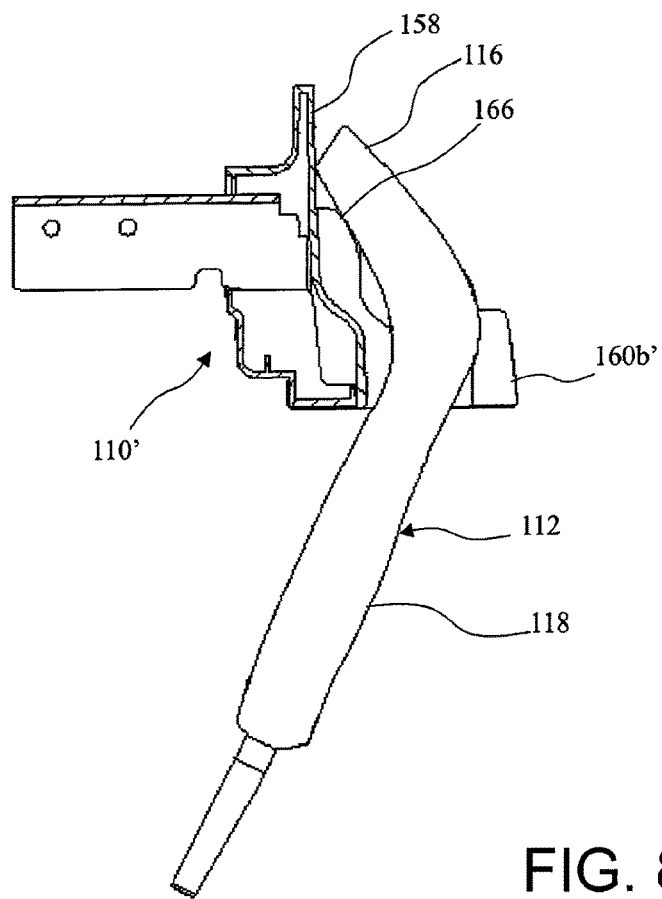
FIG. 8B is a side view for illustrating a state in which the handheld scanner is held on the holding portion illustrated in FIG. 8A.
Figure 8C:
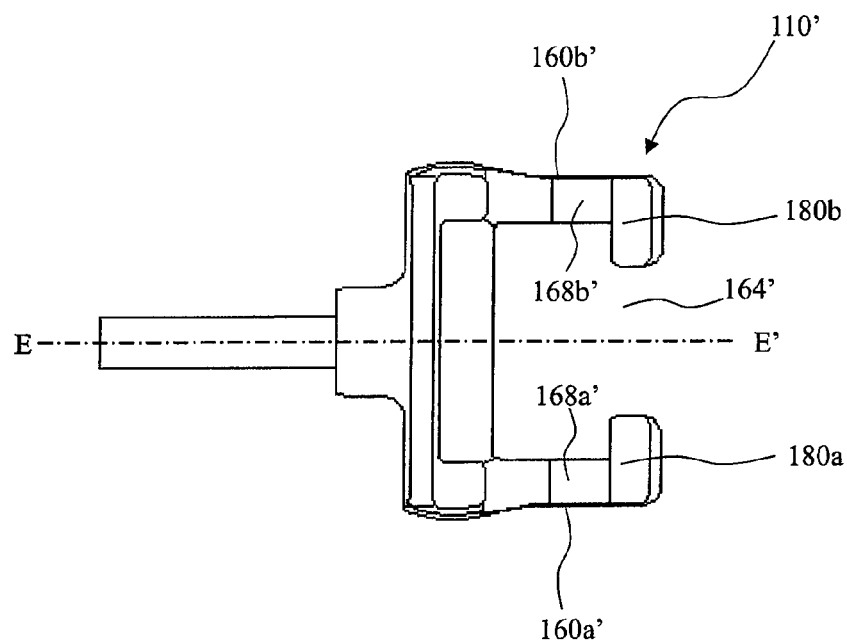
FIG. 8C is a top view of only the holding portion illustrated in FIG. 8A.
Figure 8D:
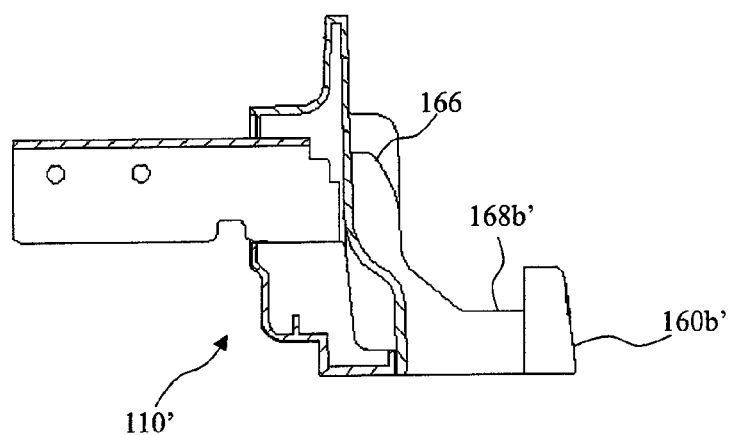
FIG. 8D is a sectional view taken along the line E-E' of FIG. 8C.
Figure 9:
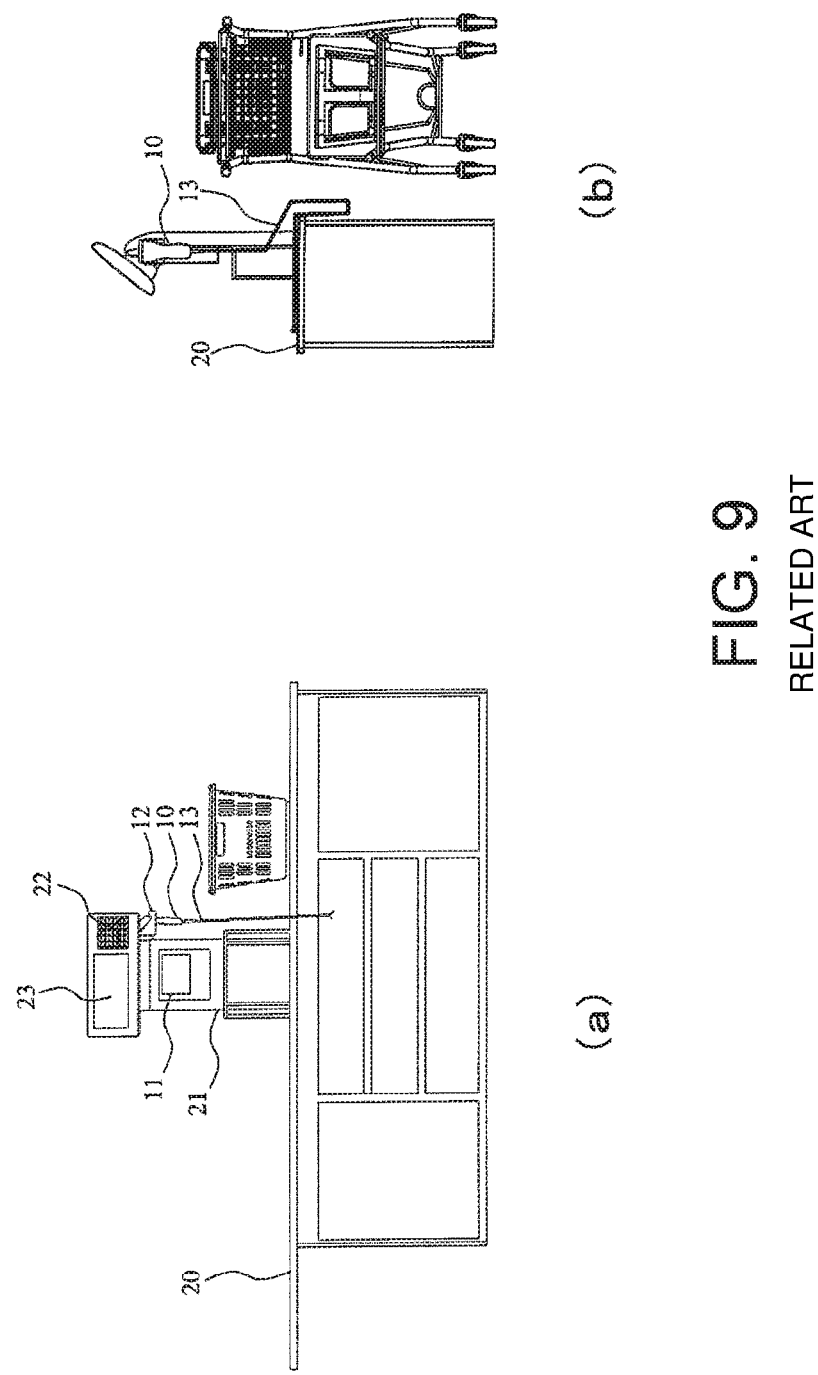
FIG. 9 is a view for illustrating a related-art stationary scanning device, in which part (a) is a front view for illustrating the stationary scanning device installed on a checkout counter, and part (b) is a side view for illustrating the scanning device installed on the checkout counter.

FIG. 8A is a top view of a state in which the handheld scanner 112 is held on the holding portion 110', and FIG. 8B is a side view of a state in which the handheld scanner 112 is held on the holding portion 110'. FIG. 8B is an illustration of the longitudinal section of the central part of the holding portion 110'. FIG. 8C is a top view of only the holding portion 110', and FIG. 8D is a sectional view taken along the line E-E' of FIG. 8C.

Similarly to the first embodiment, the lower surface of the reading part 116 of the handheld scanner 112 is in abutment against the two abutment surfaces 166 of the holding portion 110' at a position near both the side surfaces of the reading part 116.

The abutment surfaces 166 of the holding portion 110', against which the lower surface of the reading part 116 of the handheld scanner 112 is in abutment, are separately formed on the two roots of two arms 160a' and 160b'. However, the abutment surface 166 may be continuous without separation. Further, instead of the roots of the two arms 160a' and 160b', the abutment surface 166 may be formed at one point on the center of the base plate 158, for example. Similarly to the first embodiment, the side surfaces of the handheld scanner 112 are partly in abutment, near the boundary between the reading part 116 and the gripping part 118, against side-surface abutment surfaces 168a' and 168b' of the respective two arms 160a' and 160b'. The side-surface abutment surfaces 168a' and 168b' are horizontal surfaces unlike the first embodiment. Further, similarly to the first embodiment, the abutment surfaces 166 have a rounded shape.

Further, the leading end portions of the first and second arms 160*a*' and 160*b*' of the second embodiment have a first rising part 180*a* and a second rising part 180*b*, respectively.

Not only the side surfaces of the handheld scanner 112 are in abutment against the side-surface abutment surfaces 168*a*' and 168*b*' of the respective two arms 160*a*' and 160*b*' of the holding portion 110', but also the upper surface of the handheld scanner 112 is in abutment against the rear surfaces (part of the surfaces opposed to the base plate 158) of the first rising part 180*a* and the second rising part 180*b* (see FIG. 8A). The rear surfaces of the first rising part 180*a* and the second rising part 180*b* of the holding portion 110' are in abutment against the upper surface of the handheld scanner 112, and hence the handheld scanner 112 can be prevented from moving (shifting) in the direction of an insertion opening 164' when being held. In this embodiment, the rear surfaces of the first rising part 180*a* and the second rising part 180*b* of the holding portion 110', against which the upper surface of the handheld scanner is in abutment, are vertical surfaces. However, the rear surfaces of the first rising part 180*a* and the second rising part 180*b* may be surfaces slightly tilted on the base plate 158 side or on the side opposite to the base plate 158.

The holding portion 110' of the second embodiment is only required to have the abutment surfaces 166 against which the lower surface of the reading part 116 of the handheld scanner 112 is brought into abutment, the flat (horizontal) side-surface abutment surfaces 168*a*' and 168*b*' formed on the two arms 160*a*' and 160*b*' against which both the side surfaces of the handheld scanner 112 are brought into abutment, and the first rising part 180*a* and the second rising part 180*b* against which the upper surface of the handheld scanner 112 is brought into abutment, for preventing the handheld scanner 112 from moving in the direction of the insertion opening 164' when being held.

The abutment surfaces 166 of the holding portion 110', against which the lower surface of the reading part 116 of the handheld scanner 112 is brought into abutment, are needed for the gripping part 118 of the handheld scanner 112 to be tilted (to face downward and form a predetermined angle to the vertical direction). The side-surface abutment surfaces 168*a*' and 168*b*', the first rising part 180*a*, and the second rising part 180*b* formed on the two arms 160*a*' and 160*b*' of the holding portion 110' are needed for maintaining the gripping part 118 of the handheld scanner 112 in a posture facing downward and tilted on the support column 102 side with respect to the vertical direction.

In the first and second embodiments described above, the cable 142 falls in a space with a predetermined distance from the support column 102 of the stationary scanning device 100 (for example, the inner side of the support column guard 114 in this embodiment).

When the support column guard 114 is not provided to the support column 102, the cable 142 may be configured to fall in a space with a predetermined distance (for example, 50 mm) from the front surface and the side surface of the support column 102.

Further, although the stationary scanning device of this invention is described as the device configured to scan barcodes of items, this invention is applicable to stationary scanning devices configured to read two-dimensional codes, e.g., QR codes (trademark), in addition to the device for barcodes.

The first and second embodiments have been described above. Part or whole of each of the above-mentioned embodiments can also be described as follows. The following supplementary notes are not intended to limit this invention.

[Supplementary Note 1]

A stationary scanning device, comprising:

a fixed scanner portion that is mounted on a front surface of a support column and is configured to optically read item data;

a handheld scanner configured to optically read the item data; and a holding portion that is mounted on a side surface of the support column and is configured to hold the handheld scanner, the holding portion being configured to hold the handheld scanner such that a cable extending from an end portion of the handheld scanner falls in a space with a predetermined distance from the front surface and the side surface of the support column.

[Supplementary Note 2]

A stationary scanning device according to Supplementary Note 1, wherein the handheld scanner comprises:

a reading part;

a gripping part; and the cable that is connected to the reading part and is drawn out of the end portion of the gripping part, and wherein the holding portion is configured to hold the handheld scanner in a manner that the reading part faces upward and the gripping part is tilted on the support column side such that the cable falls in the space with the predetermined distance from the front surface and the side surface of the support column.

[Supplementary Note 3]

A stationary scanning device according to Supplementary Note 2, wherein the holding portion comprises;

a base plate;

two arms that are projected from the base plate and are opposed to each other; and a lower-surface abutment part against which a lower surface of the reading part is brought into abutment, and wherein each of the two arms comprises a side-surface abutment part against which corresponding one of side surfaces of the handheld scanner is brought into abutment near the gripping part.

[Supplementary Note 4]

A stationary scanning device according to Supplementary Note 3, wherein the reading part and the gripping part of the handheld scanner form a predetermined angle when seen from side surfaces of the reading part and the gripping part, wherein the handheld scanner has an end-narrow shape that a distance between the side surfaces of the handheld scanner is reduced from the reading part toward the gripping part, and wherein the side surfaces forming the end-narrow shape are each brought into abutment against the side-surface abutment part.

[Supplementary Note 5]

A stationary scanning device according to Supplementary Note 3 or 4, wherein the lower-surface abutment part is formed on one of a central portion of the base plate, and the base plate and a root portion of each of the two arms.

[Supplementary Note 6]

A stationary scanning device according to any one of Supplementary Notes 3 to 5, wherein the side-surface abutment part has one of a slope shape extending upwardly with respect to a projecting direction of the two arms, and a horizontal shape in parallel to the projecting direction of the two arms, and wherein the holding portion further comprises, when the side-surface abutment part has the horizontal shape, a rising part against which part of an upper surface of the handheld scanner is brought into abutment.

[Supplementary Note 7]

A stationary scanning device according to any one of Supplementary Notes 1 to 6, wherein the space with the predetermined distance from the front surface and the side surface comprises a space formed between the support column and a support column guard mounted on a checkout counter when the stationary scanning device is installed on the checkout counter, for protecting the front surface and the side surface of the support column.

[Supplementary Note 8]

A stationary scanning device according to any one of Supplementary Notes 1 to 7, in which the holding portion is configured to hold a gripping part of the handheld scanner such that the gripping part is tilted by 25 degrees with respect to the support column.

[Supplementary Note 9]

A stationary scanning device according to any one of Supplementary Notes 1 to 8, in which the support column has a drawing-out port, and in which the cable of the handheld scanner is drawn out through the drawing-out port.

[Supplementary Note 10]

A stationary scanning system, comprising:

a checkout counter;

a support column mounted upright on the checkout counter;

a support column guard mounted on the checkout counter, for protecting a front surface and a side surface of the support column;

a fixed scanner portion that is mounted on the front surface of the support column and is configured to optically read item data;

a handheld scanner configured to optically read the item data; and a holding portion that is mounted on the side surface of the support column and is configured to hold the handheld scanner, the holding portion being configured to hold the handheld scanner such that a cable extending from an end portion of the handheld scanner falls in a space formed between the support column guard and the support column.

[Supplementary Note 11]

A stationary scanning system according to Supplementary Note 10, wherein the handheld scanner comprises:

a reading part;

a gripping part; and the cable that is connected to the reading part and is drawn out of the end portion of the gripping part, and wherein the holding portion is configured to hold the handheld scanner in a manner that the reading part faces upward and the gripping part is tilted on the support column side such that the cable falls in the space.

[Supplementary Note 12]

A stationary scanning system according to Supplementary Note 11, wherein the holding portion comprises;

a base plate;

two arms that are projected from the base plate and are opposed to each other; and a lower-surface abutment part against which a lower surface of the reading part is brought into abutment, and wherein each of the two arms comprises a side-surface abutment part against which corresponding one of side surfaces of the handheld scanner is brought into abutment near the gripping part.

[Supplementary Note 13]

A stationary scanning system according to Supplementary Note 12, wherein the reading part and the gripping part of the handheld scanner form a predetermined angle when seen from side surfaces of the reading part and the gripping part, wherein the handheld scanner has an end-narrow shape that a distance between the side surfaces of the handheld scanner is reduced from the reading part toward the gripping part, and wherein the side surfaces forming the end-narrow shape are each brought into abutment against the side-surface abutment part.

[Supplementary Note 14]

A stationary scanning system according to Supplementary Note 12 or 13, wherein the lower-surface abutment part is formed on one of a central portion of the base plate, and the base plate and a root portion of each of the two arms.

[Supplementary Note 15]

A stationary scanning system according to any one of Supplementary Notes 12 to 14, wherein the side-surface abutment part has one of a slope shape extending upwardly with respect to a projecting direction of the two arms, and a horizontal shape in parallel to the projecting direction of the two arms, and wherein the holding portion further comprises, when the side-surface abutment part has the horizontal shape, a rising part against which part of an upper surface of the handheld scanner is brought into abutment.

[Supplementary Note 16]

A stationary scanning system according to any one of Supplementary Notes 10 to 15, in which the holding portion is configured to hold a gripping part of the handheld scanner such that the gripping part is tilted by 25 degrees with respect to the support column.

[Supplementary Note 17]

A stationary scanning system according to any one of Supplementary Notes 10 to 16, in which the support column has a drawing-out port, and in which the cable of the handheld scanner is drawn out through the drawing-out port.

[Supplementary Note 18]

A handheld scanner holding structure, which is applicable to a stationary scanning device comprising:

a fixed scanner portion that is mounted on a front surface of a support column and is configured to optically read item data; and a handheld scanner configured to optically read the item data, the handheld scanner holding structure comprising a holding portion that is mounted on a side surface of the support column and is configured to hold the handheld scanner, the holding portion being configured to hold the handheld scanner such that a cable extending from an end portion of the handheld scanner falls in a space with a predetermined distance from the front surface and the side surface of the support column.

[Supplementary Note 19]

A handheld scanner holding structure, which is applicable to a stationary scanning device according to Supplementary Note 18,
wherein the handheld scanner comprises:
a reading part;
a gripping part; and
the cable that is connected to the reading part and is drawn out of the end portion of the gripping part, and
wherein the holding portion is configured to hold the handheld scanner in a manner that the reading part faces upward and the gripping part is tilted on the support column side such that the cable falls in the space with the predetermined distance from the front surface and the side surface of the support column.

[Supplementary Note 20]

A handheld scanner holding structure, which is applicable to a stationary scanning device according to Supplementary Note 19,
wherein the holding portion comprises;
a base plate;
two arms that are projected from the base plate and are opposed to each other; and
a lower-surface abutment part against which a lower surface of the reading part is brought into abutment, and
wherein each of the two arms comprises a side-surface abutment part against which corresponding one of side surfaces of the handheld scanner is brought into abutment near the gripping part.

[Supplementary Note 21]

A handheld scanner holding structure, which is applicable to a stationary scanning device according to Supplementary Note 20,
wherein the reading part and the gripping part of the handheld scanner form a predetermined angle when seen from side surfaces of the reading part and the gripping part,
wherein the handheld scanner has an end-narrow shape that a distance between the side surfaces of the handheld scanner is reduced from the reading part toward the gripping part, and
wherein the side surfaces forming the end-narrow shape are each brought into abutment against the side-surface abutment part.

REFERENCE SIGNS LIST

10 . . . handheld scanner
11 . . . scanner portion
12 . . . holding portion
13 . . . cable
20 . . . checkout counter
21 . . . support column
22 . . . key board
23 . . . display portion
100 . . . stationary scanning device
102 . . . support column
104 . . . scanner portion
106 . . . display portion for cashier
108 . . . key board
110, 110' . . . holding portion
112 . . . handheld scanner
114 . . . support column guard
116 . . . reading part
118 . . . gripping part
120 . . . checkout counter
130 . . . shopping basket
142 . . . cable
144 . . . cable gland
150 . . . cart
152 . . . base
152-1 . . . projecting plate
152-1$a$ . . . hole
154A, 154B . . . mold component
154A-a . . . hole
156 . . . screw
158 . . . base plate
160$a$, 160$a$' . . . first arm
160$b$, 160$b$' . . . second arm
162 . . . receiving space
164, 164' . . . insertion opening
166 . . . abutment surface
168$a$, 168$b$, 168$a$', 168$b$' . . . side-surface abutment surface
170 . . . drawing-out port
180$a$ . . . first rising part
180$b$ . . . second rising part This application claims priority from Japanese Patent Application No. 2014-199904, filed on Sep. 30, 2014, the entire disclosure of which is incorporated herein by reference.

The invention claimed is:

1. A stationary scanning device, comprising:
a fixed scanner portion that is mounted on a front surface of a support column and is configured to optically read item data;
a handheld scanner configured to optically read the item data; and
a holding portion that is mounted on a side surface of the support column and is configured to hold the handheld scanner,
wherein the handheld scanner comprises a reading part, a gripping part, and a cable that is connected to the reading part and extends from an end portion of the gripping part,
wherein the cable extends from a port formed in the side surface of the support column, and has one end fixed at the port,
wherein the cable has a length at which a lower end of the cable is not brought into contact with a checkout counter when the handheld scanner is held on the holding portion,
wherein the holding portion comprises a base plate, and two arms that project from the base plate such that inner surfaces of the two arms face each other,
wherein the two arms are shaped such that a space formed between the two arms is gradually narrowed toward leading ends of the arms,
wherein the holding portion further comprises a lower-surface abutment part against which a lower surface of the reading part is brought into abutment,
wherein each of the two arms comprises a side-surface abutment part against which a corresponding one of side surfaces of the reading part of the handheld scanner is brought into abutment near the gripping part,
wherein the reading part and the gripping part of the handheld scanner form a predetermined angle when seen from side surfaces of the reading part and the gripping part, wherein the handheld scanner has an end-narrow shape such that a distance between the side surfaces of the handheld scanner is reduced from the reading part toward the gripping part, wherein the side surfaces of the handheld scanner forming the end-narrow shape are each brought into abutment against a corresponding one of the side-surface abutment parts, and when the handheld scanner is held on the holding portion, each side surface of the handheld scanner forming the end-narrow shape abut against each side-surface abutment part, and the lower surface of the reading part abuts against the lower-surface abutment part, whereby an upper surface of the reading part faces upward and a distal end portion of the gripping part is tilted toward the support column with a predetermined angle, so that the cable is extended from the end portion of the gripping part of the handheld scanner and is hung down and falls at a predetermined distance from the front surface and the side surface of the support column, and wherein the predetermined distance from the front surface and the side surface is within a space formed between the support column and a support column guard mounted on a checkout counter when the stationary scanning device is installed on the checkout counter, for protecting the front surface and the side surface of the support column.

2. A stationary scanning device according to claim 1, wherein the lower-surface abutment part is formed on one of a central portion of the base plate, and a root portion of each of the two arms.

3. A stationary scanning device according to claim 1,
wherein the side-surface abutment part has a straight shape in parallel to a projecting direction of the two arms, and
wherein the holding portion further comprises a rising part that contacts part of an upper surface of the handheld scanner.

4. A stationary scanning device according to claim 1, wherein the side-surface abutment part has a slope shape extending upwardly with respect to a direction opposite a projecting direction of the two arms.

5. A stationary scanning system, comprising:
a checkout counter;
a support column mounted upright on the checkout counter;
a support column guard mounted on the checkout counter, for protecting a front surface and a side surface of the support column;
a fixed scanner portion that is mounted on the front surface of the support column and is configured to optically read item data;
a handheld scanner configured to optically read the item data; and
a holding portion that is mounted on the side surface of the support column and is configured to hold the handheld scanner, wherein the handheld scanner comprises a reading part, a gripping part, and a cable that is connected to the reading part and extends from an end portion of the gripping part, wherein the cable extends from a port formed in the side surface of the support column, and has one end fixed at the port, wherein the cable has a length at which a lower end of the cable is not brought into contact with a checkout counter when the handheld scanner is held on the holding portion, wherein the holding portion comprises a base plate, and two arms that project from the base plate such that inner surfaces of the two arms face each other, wherein the two arms are shaped such that a space formed between the two arms is gradually narrowed toward leading ends of the arms, wherein the holding portion further comprises a lower-surface abutment part against which a lower surface of the reading part is brought into abutment, wherein each of the two arms comprises a side-surface abutment part against which a corresponding one of side surfaces of the reading part of the handheld scanner is brought into abutment near the gripping part, wherein the reading part and the gripping part of the handheld scanner form a predetermined angle when seen from side surfaces of the reading part and the gripping part, wherein the handheld scanner has an end-narrow shape such that a distance between the side surfaces of the handheld scanner is reduced from the reading part toward the gripping part, wherein the side surfaces of the handheld scanner forming the end-narrow shape are each brought into abutment against a corresponding one of the side-surface abutment parts, and when the handheld scanner is held on the holding portion, each side surface of the handheld scanner forming the end-narrow shape abuts against each side-surface abutment part, and the lower surface of the reading part abuts against the lower-surface abutment part, whereby an upper surface of the reading part faces upward and a distal end portion of the gripping part is tilted toward the support column with a predetermined angle, so that the cable is extended from an end portion of the handheld scanner and is hung down and falls at a predetermined distance from the front surface and the side surface of the support column, wherein the predetermined distance from the front surface and the side surface of the support column is within a space formed between the support column and the support column guard mounted on the checkout counter when the support column and support column guard are installed on the checkout counter, for protecting the front surface and the side surface of the support column.

* * * * *

UNITED STATES PATENT AND TRADEMARK OFFICE
CERTIFICATE OF CORRECTION

PATENT NO. : 10,354,109 B2
APPLICATION NO. : 15/307450
DATED : July 16, 2019
INVENTOR(S) : Manabu Hayahi Page 1 of 1

It is certified that error appears in the above-identified patent and that said Letters Patent is hereby corrected as shown below:

In the Claims

Column 15, Line 11; In Claim 1, delete "abut" and insert --abuts-- therefor

Signed and Sealed this
Nineteenth Day of November, 2019

Andrei Iancu
*Director of the United States Patent and Trademark Office*